United States Patent
Wilson et al.

(10) Patent No.: US 6,727,197 B1
(45) Date of Patent: Apr. 27, 2004

(54) WEARABLE TRANSMISSION DEVICE

(75) Inventors: Patricia Wilson, Arlington, MA (US);
Justyna Teverovsky, Acton, MA (US);
Brian Farrell, Quincy, MA (US);
Wendy B. Horowitz, Branchburg, NJ
(US); Carole A. Winterhalter,
Marlborough, MA (US); Richard A.
Covel, Stow, MA (US); Edward
Joseph Tierney, West Milton, PA (US)

(73) Assignee: Foster-Miller, Inc., Waltham, MA (US)

(*) Notice: Subject to any disclaimer, the term of this patent is extended or adjusted under 35 U.S.C. 154(b) by 164 days.

(21) Appl. No.: 09/715,496

(22) Filed: Nov. 17, 2000

Related U.S. Application Data

(60) Provisional application No. 60/166,273, filed on Nov. 18, 1999.

(51) Int. Cl.[7] .............................. B32B 3/02; H01B 7/08; D04C 1/00; D03D 15/00
(52) U.S. Cl. .................. 442/301; 428/101; 428/189; 428/190; 428/222; 87/5; 87/8; 87/13; 174/117 F; 174/117 R
(58) Field of Search .................. 174/117 F, 117 R, 174/117 M; 87/5, 8, 9, 13; 428/101, 189, 190, 222; 442/301

(56) References Cited

U.S. PATENT DOCUMENTS

| | | | |
|---|---|---|---|
| 2,953,970 A | 9/1960 | Maynard | 88/113 |
| 2,963,535 A | 12/1960 | Wegener et al. | 174/36 |
| 2,963,538 A | 12/1960 | Dahlgren | 174/117 |
| 2,997,521 A | 8/1961 | Dahlgren | 174/68.5 |
| 3,086,071 A | 4/1963 | Preston | 174/117 |
| 3,229,030 A | 1/1966 | Baermann | 174/117 |
| 3,247,755 A | 4/1966 | Siegmund | 88/1 |
| 3,288,175 A | 11/1966 | Valko | 139/425 |
| 3,371,250 A | 2/1968 | Ross et al. | 317/101 |
| 3,414,666 A | 12/1968 | Doudoulakis et al. | 174/68.5 |
| 3,473,872 A | 10/1969 | Okamura | 355/1 |
| 3,507,321 A | 4/1970 | Palma | 165/46 |
| 3,551,585 A | 12/1970 | Smart et al. | 174/72 |
| 3,711,627 A | 1/1973 | Maringulov | 174/68.5 |
| 3,778,331 A | 12/1973 | Scharf | 161/67 |
| 3,926,360 A | 12/1975 | Moister, Jr. | 228/180 |

(List continued on next page.)

FOREIGN PATENT DOCUMENTS

EP  0 320 901 A2  6/1989 .......... B32B/15/08

OTHER PUBLICATIONS

"Wearable Sensor Badge & Sensor JAcket for Context Awareness", Farringdon et al., Philips Research Laboratories, Surrey, U.K., 1999 IEEE, pp. 107–113.

"Electric Suspenders: A Fabric Power Bus and Data Network for Wearable Digital Devices", Michael M. Gorlick, The Aerospace Corporation, EL Segundo, California, 1999 IEEE, pp. 114–121.

"Smart Fabric, or Washable Computing", E. Rehmi Post, Maggie Orth, MIT Media Laboratory, Cambridge, MA, 5 pages.

"E–broidery: Design and fabrication of textile–based computing", by E.R. Post et al., IBM Systems Journal, vol. 39, Nos 3&4, 2000, pp. 840–860.

"Intrabody Buses for Data and Power", E. Rhemi Post et al., MIT Media Laboratory, 1997 IEEE, pp. 52–55.

*Primary Examiner*—Cheryl A. Juska
*Assistant Examiner*—Jenna-Leigh Befumo
(74) *Attorney, Agent, or Firm*—Iandiorio & Teska

(57) ABSTRACT

A knitted, woven, or braided textile ribbon including fibers and having a length and selvage edges and one or more transmission elements running the length of the ribbon in place of one or more of the fibers and integrated with the fibers to transmit data and/or power along the length of the ribbon.

76 Claims, 7 Drawing Sheets

U.S. PATENT DOCUMENTS

| | | | |
|---|---|---|---|
| 4,031,284 A | 6/1977 | Ingraham | 428/222 |
| 4,106,677 A | 8/1978 | Helmso et al. | 224/219 |
| 4,111,510 A | 9/1978 | Zurcher | 439/67 |
| 4,145,030 A | 3/1979 | Ingraham | 256/1 |
| 4,158,103 A | 6/1979 | Danilin et al. | 174/68.5 |
| 4,191,800 A | 3/1980 | Holtzman | 442/233 |
| 4,196,355 A | 4/1980 | Maine | 250/516 |
| 4,227,520 A | 10/1980 | Lord | 128/201.24 |
| 4,229,615 A | 10/1980 | Orr, Jr. et al. | 174/117 M |
| 4,254,951 A | 3/1981 | De Laney | 273/1 |
| 4,281,237 A | 7/1981 | Berenson | 219/511 |
| 4,370,658 A | 1/1983 | Hill | 343/713 |
| 4,430,384 A | 2/1984 | George | 428/377 |
| 4,452,847 A | 6/1984 | Siemon | 428/246 |
| 4,590,623 A | 5/1986 | Kitchman | 2/85 |
| 4,658,089 A | 4/1987 | Guzy et al. | 174/113 R |
| 4,670,351 A | 6/1987 | Keane et al. | 428/549 |
| 4,684,762 A | 8/1987 | Gladfelter | 174/36 |
| 4,709,397 A | 11/1987 | Voshall et al. | 383/5 |
| 4,735,847 A | 4/1988 | Fujiwara et al. | 428/209 |
| 4,753,088 A | 6/1988 | Harrison et al. | 66/202 |
| 4,761,005 A | 8/1988 | French et al. | 273/1 |
| 4,803,096 A | 2/1989 | Kuhn et al. | 427/121 |
| 4,814,585 A | 3/1989 | Klein | 219/545 |
| 4,851,613 A | 7/1989 | Jacques | 174/254 |
| 4,868,565 A | 9/1989 | Mettes et al. | 340/854.9 |
| 4,875,144 A | 10/1989 | Wainwright | 362/103 |
| 4,877,646 A | 10/1989 | Kuhn et al. | 427/121 |
| 4,912,611 A | 3/1990 | Lyle | 362/156 |
| 4,913,978 A | 4/1990 | Klotz et al. | 428/551 |
| 4,948,951 A | 8/1990 | Balzano | 219/528 |
| 4,983,452 A | 1/1991 | Daimon et al. | 442/378 |
| 4,992,335 A | 2/1991 | Guerra et al. | 428/518 |
| 5,008,517 A | 4/1991 | Brekkestran et al. | 219/211 |
| 5,032,705 A | 7/1991 | Batcheller et al. | 219/211 |
| 5,047,788 A | 9/1991 | Gillard | 343/915 |
| 5,073,984 A | 12/1991 | Tone et al. | 2/457 |
| 5,103,504 A | 4/1992 | Dordevic | 2/243 |
| 5,126,920 A | 6/1992 | Cardashian et al. | 361/398 |
| 5,140,131 A | 8/1992 | Macher et al. | 219/211 |
| 5,316,830 A | 5/1994 | Adams, Jr. et al. | 428/195 |
| 5,318,845 A | 6/1994 | Tanaka et al. | 428/373 |
| 5,331,115 A | 7/1994 | Ysbrand | 174/117 M |
| 5,332,869 A | 7/1994 | Hagiwara | 174/257 |
| 5,342,204 A | 8/1994 | Och | 439/39 |
| 5,357,593 A | 10/1994 | Bossler | 385/49 |
| 5,362,656 A | 11/1994 | McMahon | 437/21 |
| 5,371,326 A | 12/1994 | Clearwaters-Dreager et al. | 174/128.1 |
| 5,393,928 A | 2/1995 | Cribb et al. | 174/36 |
| 5,457,610 A | 10/1995 | Bernardoni et al. | 361/816 |
| 5,499,927 A | 3/1996 | Ohno et al. | 439/285 |
| 5,502,631 A | 3/1996 | Adachi | 361/760 |
| 5,523,528 A | 6/1996 | Bese et al. | 174/36 |
| 5,531,405 A | 7/1996 | Goldberg | 244/134 B |
| 5,538,781 A | 7/1996 | Rao et al. | 428/229 |
| 5,543,585 A | 8/1996 | Booth et al. | 174/261 |
| 5,600,098 A | 2/1997 | Kazaks | 174/135 |
| 5,674,752 A | 10/1997 | Buckley et al. | 436/151 |
| 5,680,681 A | 10/1997 | Fuss | 24/704.1 |
| 5,691,062 A | 11/1997 | Shalaby et al. | 428/411.1 |
| 5,747,101 A | 5/1998 | Booth et al. | 427/96 |
| 5,763,058 A | 6/1998 | Isen et al. | 428/209 |
| 5,774,341 A | 6/1998 | Urbish et al. | 361/774 |
| 5,786,977 A | 7/1998 | Cohen | 361/223 |
| 5,802,607 A | 9/1998 | Triplette | 2/1 |
| 5,824,996 A * | 10/1998 | Kochman et al. | 219/529 |
| 5,829,987 A | 11/1998 | Fritsch et al. | 439/38 |
| 5,832,296 A | 11/1998 | Wang et al. | 710/3 |
| 5,837,624 A | 11/1998 | Sakaguchi et al. | 442/208 |
| 5,876,430 A | 3/1999 | Shoberg et al. | 607/122 |
| 5,883,364 A | 3/1999 | Frei et al. | 219/535 |
| 5,906,004 A | 5/1999 | Lebby et al. | 2/1 |
| 5,912,653 A | 6/1999 | Fitch | 345/87 |
| 5,914,585 A | 6/1999 | Grabon | 320/125 |
| 5,914,660 A | 6/1999 | Mesibov et al. | 340/573 |
| 5,926,144 A | 7/1999 | Bolanos et al. | 343/718 |
| 5,931,764 A | 8/1999 | Freeman et al. | 482/4 |
| 5,970,921 A | 10/1999 | Fulton | 119/858 |
| 5,989,120 A | 11/1999 | Truchsess | 463/7 |
| 5,995,077 A | 11/1999 | Wilcox et al. | 345/112 |
| 5,997,983 A | 12/1999 | Caron et al. | 428/105 |
| 6,023,372 A | 2/2000 | Spitzer et al. | 359/630 |
| 6,024,575 A | 2/2000 | Ulrich | 434/236 |
| 6,026,512 A | 2/2000 | Banks | 2/69 |
| 6,080,690 A | 6/2000 | Lebby et al. | 442/209 |
| 6,097,607 A | 8/2000 | Carroll et al. | 361/752 |
| 6,105,624 A | 8/2000 | Wildeman et al. | 139/383 R |
| 6,117,554 A | 9/2000 | Shalaby et al. | 428/420 |
| 6,121,171 A | 9/2000 | Takahashi et al. | 442/289 |
| 6,121,547 A | 9/2000 | Harada | 174/36 |
| 6,126,572 A | 10/2000 | Smith | 482/4 |
| 6,128,004 A | 10/2000 | McDowall et al. | 345/158 |
| 6,210,771 B1 | 4/2001 | Post et al. | 428/100 |
| 6,231,516 B1 | 5/2001 | Keilman et al. | 600/485 |
| 6,270,466 B1 | 8/2001 | Weinstein et al. | 600/590 |
| 6,324,053 B1 * | 11/2001 | Kamijo | 361/683 |
| 6,341,550 B1 * | 1/2002 | White | 87/5 |
| 6,381,482 B1 * | 4/2002 | Jayaraman et al. | 600/388 |

* cited by examiner

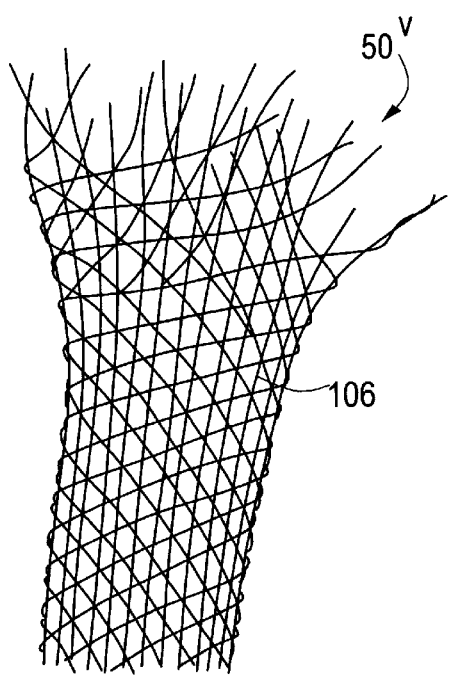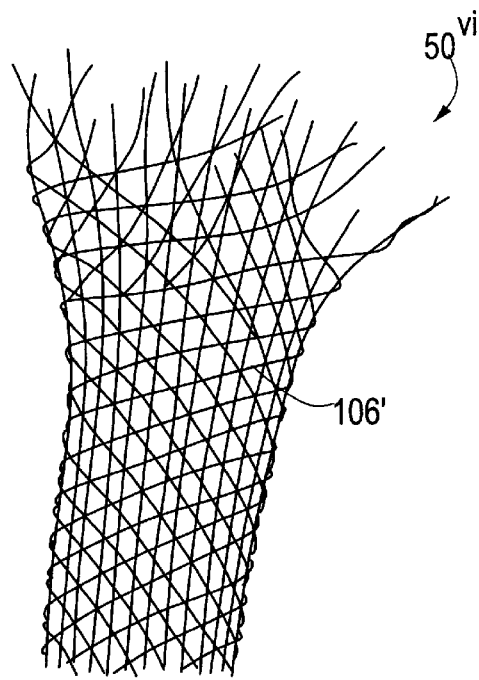
FIG. 9  FIG. 10A
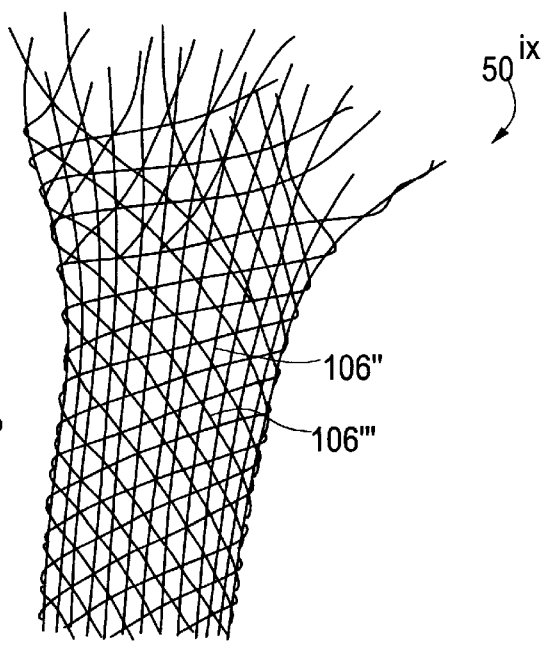
FIG. 10B

WEARABLE TRANSMISSION DEVICE

PRIORITY CLAIM

This application claims priority from U.S. Provisional Application Ser. No. 60/166,273 filed on Nov. 18, 1999.

GOVERNMENT RIGHTS

This invention was made with U.S. Government support under Contract Nos. DAAN02-98-P-8523 and DAAD16-99-C-1016 and awarded by the U.S. Army to the assignee of the subject invention and under Contract No. DAAD16-99-C-1047 awarded by the U.S. Army to BAE Systems Aerospace, Inc. and subcontracted to the assignee of the subject invention under MASD Order No. K153869. The government may have certain rights in the subject invention.

FIELD OF THE INVENTION

This invention relates to "wearable electronics", "wearable computers", "smart fabrics" and the like and more particularly to a data or power transmission ribbon made of knitted, woven, or braided textile fibers but also including integral transmission elements, e.g., conductive wires or optical fibers.

BACKGROUND OF THE INVENTION

The idea of "wearable computers" and electronic circuits built entirely out of textiles to distribute data and power and designed to perform functions such as touch sensing was first fully described in a disclosure called "Smart Fabric, or Washable Computing" by E. Rehmi Post and Maggie Orth of the MIT Media Laboratory available on the Internet at http:/www.media.mit.edu/%7EREHMI/fabric/index.html and also on pp. 167–8 of the Digest of Papers of the First IEEE International Symposium on Wearable Computers, Oct. 13–14, 1997 held in Cambridge, Mass.

Prior to the applicant's invention described herein, electrical or electronic components were sometimes fastened to articles of clothing or placed in pouches or pockets. Individual wires between these components were then fastened to the outside of the clothing or disposed partially or wholly in seams and the like. In this way, a soldier could "wear" a radio and a computer and/or global positioning satellite system. Consumers, in turn, could, for example, "wear" a cellular telephone connected to a headset or a speaker and/or microphone located on the collar of a jacket.

The problem with this design is that the wires are separate from the textile material of the clothing. As a result, the wires are unsightly and uncomfortable, do not wear well, can catch and tangle on objects, reduce mobility, add weight, are not washable, and are not resistant to corrosion. In general, such a design is not very robust.

Therefore, those skilled in the art sought to integrate the electronic circuits and data and power conductors within the textile of the articles of clothing themselves. See the MIT disclosure referred to above and incorporated herein by this reference. In the MIT reference, metallic yarn forms the weft of the fabric and, running in the other direction, plain silk thread forms the warp of the fabric. Surface mount light emitting diodes (LED's), crystal piezo transducers, and other surface mount components are then soldered directly onto the metallic yarn.

But, since the metallic yarn only runs in one direction, communications and interconnections between the electronic devices can only take place in that direction. Worse, the individual metallic yarns which do not electrically interconnect two components must be cut to provide electrical isolation for the individual metallic yarns which do electrically interconnect two components. This design thus raises serious design concerns, namely manufacturability, shielding, and electrical interference. Moreover, the fabric including the soldered on electronic components is delicate, cannot be washed, and is uncomfortable to wear. Finally, if the fabric is folded back on itself, an electrical short will occur. Thus, special insulative coatings or substrates must be used which further render the fabric uncomfortable to wear.

Others have designed textile fabrics with conductive fibers for electrically interconnecting two electronic components. See U.S. Pat. Nos. 6,080,690 and 5,906,004 incorporated herein by this reference. Again, the main idea is that the whole garment is made of this special fabric. As such, a sensor can be electrically connected to a controller right on the garment. Still, routing of the data or power between the devices is limited without extensive formation of electrical junctions in the fabric —a very cumbersome manufacturing process. In addition, such garments are also uncomfortable and cannot withstand repeated wash cycles. See also U.S. Pat. No. 3,414,666 incorporated herein by this reference.

Before the invention described herein, no one to our knowledge has designed textile materials with integrated data or power buses which are simple to manufacture, pleasing in appearance, comfortable, washable, which wear well, which do not add significant weight, which are corrosion resistant, which do not impede mobility, which exhibit high fatigue strengths, and which also properly meet or exceed the electrical interface and shielding requirements of the specific application be it military or consumer-based.

SUMMARY OF THE INVENTION

It is therefore an object of this invention to provide a novel and more robust data and/or power transmission device.

It is a further object of this invention to provide such a data or power transmission device which is made of a textile material with integrated data and/or power buses.

It is a further object of this invention to provide such a data or power transmission device which is simple to manufacture and pleasing in appearance.

It is a further object of this invention to provide such a data or power transmission device which is comfortable to wear and which has a long wear life.

It is a further object of this invention to provide such a data or power transmission device which is able to withstand repeated wash cycles.

It is a further object of this invention to provide such a data or power transmission device which is not susceptible to corrosion and which exhibits a high fatigue strength.

It is a further object of this invention to provide such a data or power transmission device which meets or exceeds the electrical interference and/or shielding requirements of the specific application it is used for.

It is a further object of this invention to provide such a data or power transmission device which is versatile in design.

It is a further object of this invention to provide a data or power transmission device which is transferable from one garment to another garment.

It is a further object of this invention to provide such a device which does not impede the mobility of the wearer of the device.

The invention results from the realization that the shortcomings of current "wearable electronics", "wearable computer systems" and "smart fabrics", namely, a lack of comfort and durability, can be overcome, not by manufacturing a garment out of a textile fabric with conductive fibers, but, instead, by knitting, weaving, or braiding a textile ribbon with selvage edges and including transmission elements which extend or run the length of the ribbon and then attaching the ribbon to a comfortable and durable garment between two electronic or electrical devices on the garment such that the transmission elements in the ribbon optically or electrically interconnect the two devices. The ribbon thus becomes an integral part of the textile item without suffering from the limitations associated with prior art textile articles with electronic circuits and data and power conductors formed therein. Moreover, the ribbon can be releasably attached to the garment or textile item thus allowing it to be transferred between, for example, different articles of clothing.

This invention features a data or power transmission device including a knitted, woven, or braided textile ribbon including fibers and having a length and selvage edges; and one or more transmission elements running the length of the ribbon in place of one or more of the fibers and integrated with the fibers to transmit data and/or power along the length of the ribbon. Typically, the one or more transmission elements are separated by non-conductive fibers. But, in other embodiments, a plurality of the fibers are also conductive.

If the transmission device is a data bus, there are typically at least two transmission elements insulated from each other by the fibers. For a universal serial bus, four transmission elements are provided and insulated from each other by the fibers.

The transmission elements may be solid wire, tinsel wire, conductive fibers, polymers fibers coated or doped with a conductive material, optical fibers, and combinations of the same. As such, each transmission element may be bare, insulated, or shielded, or both insulated and shielded.

In one embodiment, the ribbon is knitted and includes wales and courses of overlapping fibers and transmission elements. In another embodiment, the ribbon is woven and includes weft and warp fibers. Typically, the transmission elements replace one or more warp fibers but not the weft fibers. In another embodiment, the transmission elements replace one or more weft fibers but not the warp fibers. In yet another embodiment, the transmission elements may replace all or certain fibers in both the warp and weft directions. If the ribbon is braided, it may include axial fibers and bias fibers. The transmission elements typically replace one or more axial fibers but not the bias fibers. In another embodiment, the transmission elements replace one or more bias fibers. In still another embodiment, the transmission elements replace all or certain fibers in both the axial and bias directions.

The fibers may be grouped together in the form of yarns. The fibers are also selected from a wide class of natural or synthetic fibers.

In the preferred embodiment, the ribbon is narrow woven and may have more than one face. But, if ribbon is knitted, it may also include more than one face. In still other embodiments, the ribbon forms an antenna, a simple power bus, a fire wire bus or a coaxial bus.

A wearable data or power transmission system in accordance with this invention features a garment, a first subsystem, a second subsystem, and a knitted, woven, or braided textile ribbon having a length which extends between the first and second subsystems. The ribbon includes fibers, selvage edges, and one or more transmission elements running the length of the ribbon in place of one or more of the fibers. Each transmission element is connectable on one end to the first subsystem connectable on the other end to the second subsystem to establish a data or power transmission link between the first and second subsystems. The first subsystem is typically attached at one location on the garment, the second subsystem may be attached at a second location on the garment or elsewhere, and the ribbon is then attached to the garment between the first and second subsystems.

The first subsystem and the second subsystem may be power sources, electrical devices, electronic systems, electronic devices, optical devices or sensors, and combinations of the same. In one embodiment, the ribbon forms a data or power bus between the first and second subsystems. In another embodiment, the ribbon forms an antenna.

The subject invention, however, is not limited to wearable garments. For any textile article, the data or power transmission system includes a first subsystem, a second subsystem, and a knitted, woven, or braided textile ribbon having a length which extends between the first and second subsystems. The ribbon includes fibers, selvage edges, and one or more transmission elements running the length of the ribbon in place of one or more of the fibers. Each transmission element is connectable on one end to the first subsystem and connectable on the other end to the second subsystem to establish a data or power transmission link between the first and second subsystems. The textile article (e.g., a tent, parachute, blanket or car seat cover) may include the first and second subsystems or one or both subsystems may be remote from the textile article.

BRIEF DESCRIPTION OF THE DRAWINGS

Other objects, features and advantages will occur to those skilled in the art from the following description of a preferred embodiment and the accompanying drawings, in which:

FIG. 9 is a plan view of the braided form of the data or the power transmission device of the subject invention wherein the transmission elements run in the direction of the axial fibers only;

FIG. 10A is a plan view of the braided form of the data or power transmission device of the subject invention wherein the transmission elements run in the direction of the bias fibers;

FIG. 10B is a plan view of the braided form of the data or power transmission device of the subject invention wherein the transmission elements run in the direction of the axial and bias fibers;

DISCLOSURE OF THE PREFERRED EMBODIMENTS

Figure 1:
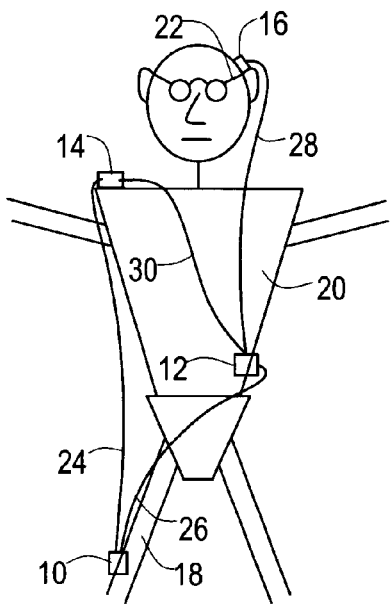
FIG. 1 is a schematic view of one prior art way of interconnecting electronic components worn by a user.

One attempt to enable military personnel and consumers to "wear" electronic devices 10, 12, 14, and 16, FIG. 1 is to attach the devices to garment pieces 18 (pants), 20 (a shirt or coat) and/or other wearable items (e.g., glasses 22, a belt, suspenders, a pack, pockets, and the like) and route individual wires or conventional data or power buses 24, 26, 28, and 30 between the devices as necessary to interconnect them. These "transmission elements" hang loose, are secured to the garment at discrete locations, extend in or along the seams of the garment pieces, or in pockets or channels sewn onto the garment pieces.

The problem with this design is fairly self-evident. As discussed in the Background of the Invention section above, such a design is unsightly, uncomfortable, does not wear well, is not washable, is not sufficiently corrosion resistant, and suffers from low fatigue strength. Also, wires 24, 26, 28, and 30 can become tangled or caught on other objects. In sum, the design shown in FIG. 1 is not very durable and limits mobility.

Figure 2:
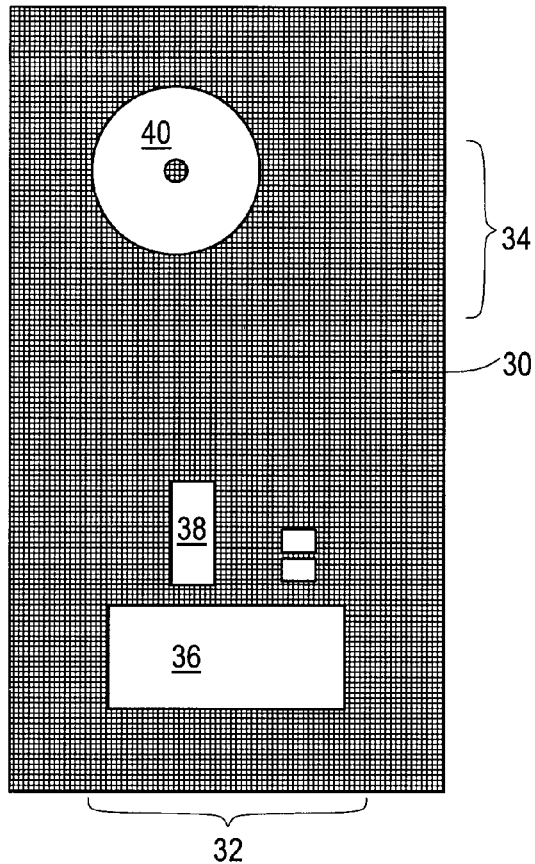
FIG. 2 is a top plan view of one prior art "smart fabric" design.

The latest evolution in "wearable electronics" or "wearable computers" is shown in FIG. 2. In this design, the "transmission elements" are integrated with the fabric of the garment piece. That is, woven fabric 30 includes conductive fibers 32 running in the direction of the weft and silk or some other non-conductive fibers 34 running in the direction of the warp. Electronic components 36, 38, and 40 are soldered onto fabric 30. Since, however, all of the fibers running in the direction of the weft are conductive, the electrical connection between components 36 and 38 can only be effected by cutting all the conductive fibers which do not interconnect the correct solder pads of each component. Moreover, it is difficult to interconnect component 36 with another component placed adjacent to component 36 in the direction of the warp fibers since the warp fibers are not conductive. Thus, solder must be deposited to run in the direction of the warp fibers if electrical interconnections are to be made between two such components.

The other problems associated with the design of FIG. 2 are delineated in the Background of the Invention section above and include the fact that the resulting garment is uncomfortable and that special insulative coatings or substrates must be used to prevent electrical shorts from occurring when the fabric folds back on itself which further renders the fabric uncomfortable to the wearer. Also, a garment made of the fabric shown in FIG. 2 can not withstand repeated wash cycles. Other attempts at turning the fabric of a garment into a circuit "board" have also met with limited success because of similar problems.

Figure 3:
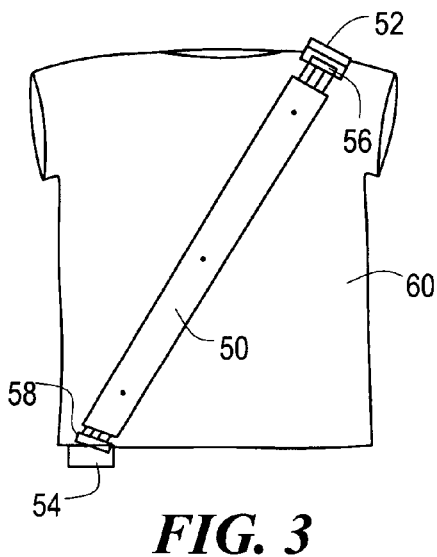
FIG. 3 is a schematic view of the data or power transmission device of the subject invention permanently or releasably attached to an article of clothing and extending between two electronic devices.

This invention involves somewhat of a paradigm shift from the prior art designs: instead of running the transmission elements loosely along or within the fabric, the idea is to form a durable or washable textile ribbon 50, FIG. 3 with integral transmission elements in place of one or more of the regular natural or synthetic fibers, threads, yarns, filaments, or plies and extending along the length of the ribbon to interconnect various electronic or electrical components (subsystems 52 and 54 in FIG. 3) via optional connectors 56 and 58, respectively.

Ribbon 50 is then attached to garment 60 (in this example a shirt or jacket) or a textile article (e.g., a blanket, a car seat cover, and the like) at one or more places by sewing, by the use of fasteners, and the like. The ribbon may interconnect two electronic devices on the same garment, or one electronic device on the garment and a second electronic device located on another garment or a belt. Ribbon 50 may be used in conjunction with garments, textile articles (e.g., blankets, sleeping bags), and other gear or items (e.g., handwear, tents, footwear, body armor, helmets, backpacks, and duffel bags).

The result is a solution to the shortcomings of current "wearable computing" systems, namely the lack of comfort and durability. Ribbon 50 also overcomes several other drawbacks of the prior art: It is simple to manufacture, pleasing in appearance, comfortable, wears well, is washable, corrosion resistant, does not create snag points, is transferable, and exhibits high fatigue strengths. Ribbon 50 can also be designed to meet specific electrical interference and shielding requirements depending on the specific implementation.

Figure 4:
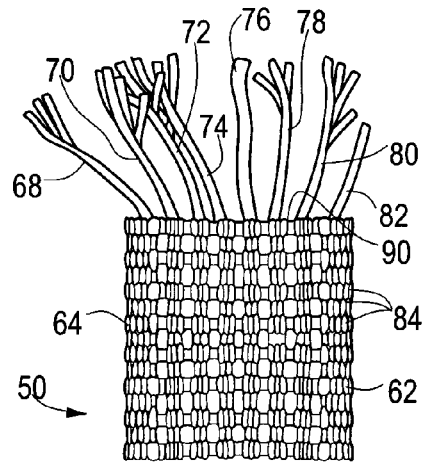
FIG. 4 is a view of one end of the data or power transmission device shown in FIG. 3.

A portion of one embodiment of ribbon 50 is shown in FIG. 4. Ribbon 50 forms a data or power transmission device and may be knitted, woven, or braided of textile fibers 84 and has a length which extends between two components to be interconnected. Selvage edges 62 and 64 prevent unraveling of ribbon 50 and provide a distinct structural advantage over the broad woven fabrics of the prior art which did not include selvage edges due to the need to cut various fabric pieces into the shape of the garment.

One or more transmission elements 68, 70, 72, 74, 76, 78, 80, and 82 run the length of ribbon 50 in place of one or more of fibers 84 and are integrated with the fibers to transmit data (e.g., analog or digital or optical signals representing commands, voice transmissions, and other inputs and outputs, and the like) and/or power along the length of the ribbon. The transmission elements are knitted, woven, or braided in the same fashion as the regular fibers are knitted, woven, or braided which renders the invention extremely versatile.

Typically, the transmission elements are separated by non-conductive fibers 84 but this may not be true in the case of a simple power bus since, in that design, all of the longitudinally running fibers may be conductive.

In the embodiment where ribbon 50 forms a data bus (e.g.; a RS232 data bus), there are at least two but typically more transmission elements insulated from each other by regular textile fibers between them as shown in FIG. 4 at 90. A universal serial bus (USB) is formed by four transmission elements insulated from each other as discussed infra.

Transmission elements 68–82 may be solid wire, tinsel wire, conductive fibers, polymeric fibers coated or doped with conductive material, optical fibers (as shown for transmission element 76) and combinations of the same. Each transmission element may be bare, insulated, or shielded or both insulated and shielded as is known in the electrical arts. Such versatility is not possible with the wearable fabric designs of the prior art. In the preferred embodiment, tinsel wire is used due to its durability. The choice of the configuration for and the material of the transmission element depends to a large extent on the end use but the availability of different types of transmission elements useful in the subject invention again renders the subject invention extremely versatile when compared to prior art designs.

Figure 6:
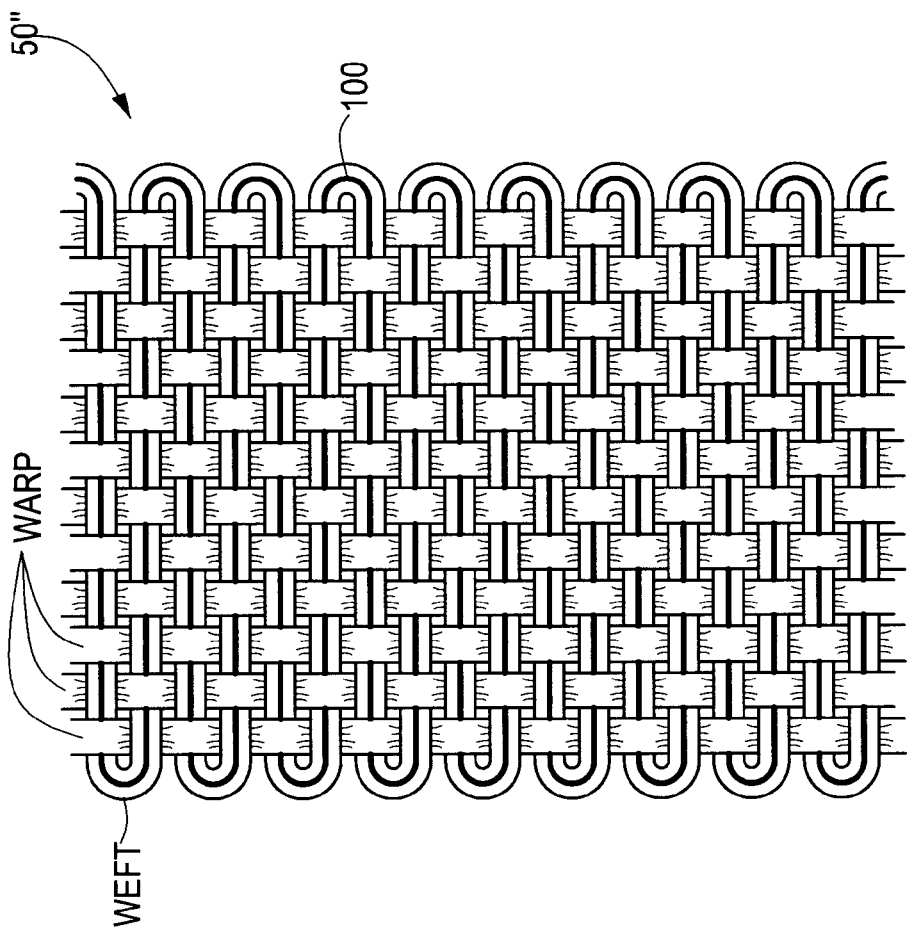
FIG. 6 is a plan view of the woven form of the data or power transmission device of the subject invention wherein the transmission elements run in the weft direction only.
Figure 5:
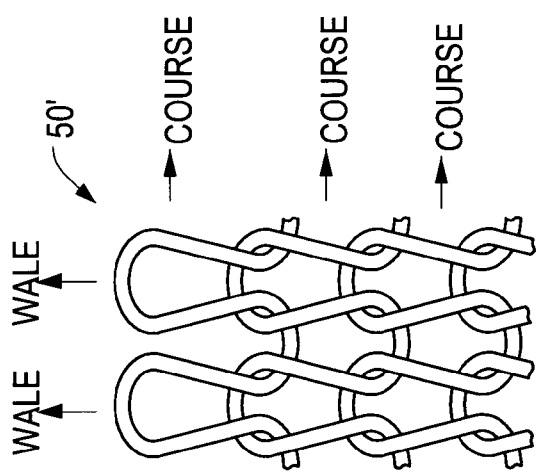
FIG. 5 is a plan view of the knitted form of the data or power transmission device of the subject invention.
Figure 8:
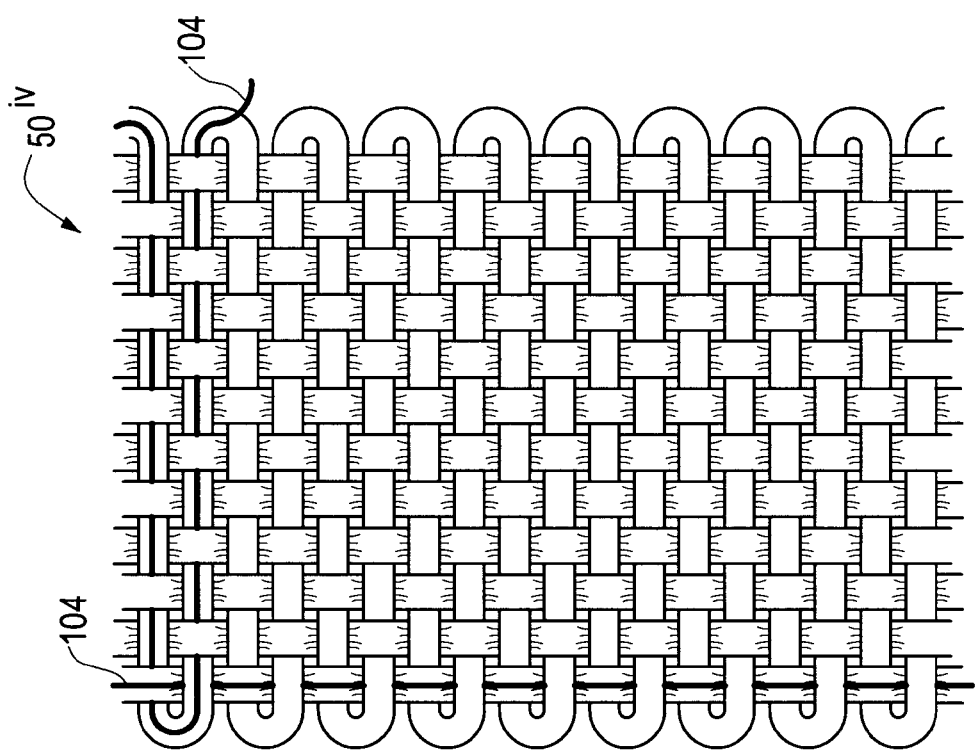
FIG. 8 is a plan view of the woven form of the data or power transmission device of the subject invention wherein the transmission elements run both in the weft and warp directions.
Figure 7:
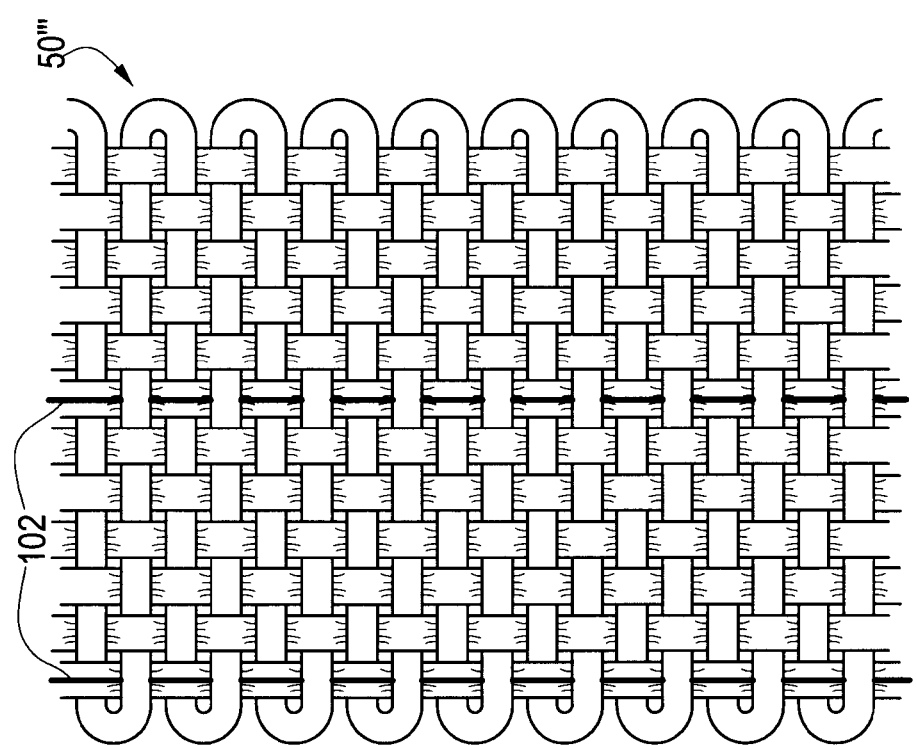
FIG. 7 is a plan view of the woven form of the data or power transmission device of the subject invention wherein the transmission elements run in the warp direction only.

There are also various methods available for forming ribbon 50. In one embodiment, ribbon 50', FIG. 5 is knitted and includes wales and courses of overlapping fibers and transmission elements as shown in FIG. 5. Typically, the transmission elements form the courses (e.g., they are all conductive) and/or the wales (e.g., they are also all conductive). In another embodiment, ribbon 50", FIG. 6 is narrow woven and includes weft and warp fibers. Typically, the transmission elements replace one or more weft fibers but not the warp fibers as shown at 100 in FIG. 6. In still another embodiment, ribbon 50''', FIG. 7 is woven and includes weft and warp fibers and the transmission elements replace one or more of the warp fibers but not the weft fibers as shown at 102 in FIG. 7. In still another embodiment, the transmission elements replace one or more of the weft and warp direction fibers as shown at 104 in FIG. 8 for ribbon $50^{iv}$.

Ribbon $50^v$, FIG. 9 may also be braided to include axial and bias fibers as shown. The transmission elements typically replace one or more of the axial fibers but usually not the bias fibers as shown at 106 in FIG. 9. However, the transmission elements may also replace one or more of the bias fibers as shown in FIG. 10A at 106∝ to form shielding or simple power bus $50^{vi}$. Also, as shown in FIG. 10B, the transmission elements may replace one or more axial fibers 106" and one or more bias fibers 106'" to form shielding or simple power bus $50^{ix}$. Again, the availability of the many different methods of forming the ribbon render the subject invention extremely versatile when compared to prior art designs.

As is known in the textile arts, the fibers may be grouped together in the form of yarns and many different natural or synthetic fibers may be used depending on the implementation- a fact which again renders the subject invention extremely versatile. Also, woven ribbons and knitted ribbons can have more than one face. In the design shown in FIG. 4 the fibers were multifillament nylon which met the MIL-W-43668 specification. The transmission elements include sheathed 250 micron plastic optical fiber 76 and PVC insulated silver coated copper seven strand tinsel wires 68, 70, 72, 74, 78, 80 and 82. Ribbon 50 was 100 yards or more in length and one inch wide and can be cut to produce a number of data or power transmission devices in accordance with the subject invention.

The ribbons of FIGS. 4–10 can be permanently or releasably attached in many different ways to nearly any type of garment or textile article or a belt, for example, for interconnecting a wide variety of subsystems 52 and 54, FIG. 3. Typical subsystems include power sources, electrical devices, electronic systems, electronic devices, discrete electronic chips, optical devices, switching devices, and sensors. Powerpacks, cellular telephone components, global positioning system components, personal data assistants, lamps, displays, and the like are typical examples. Typical releasable attachment means for the ribbon include hook and loop fasteners, snaps, and the like. As such, the ribbon can be transferred from one garment to another. In other embodiments, the ribbon is permanently attached to the garment or textile article by sewing, for example.

Figure 11A:
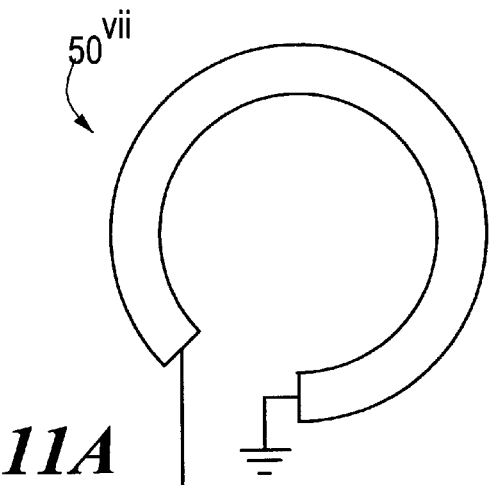
FIGS. 11A and 11B are plan views of the data or power transmission device of the subject invention in the form of an antenna.
Figure 11B:
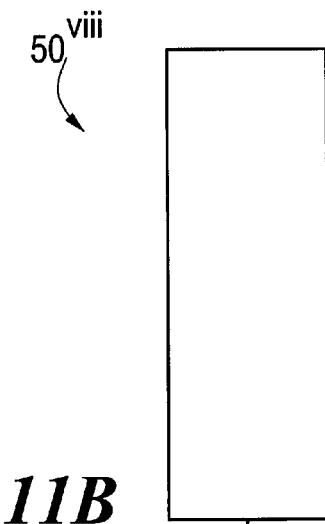

In one embodiment, ribbon $50^{vii}$ forms a loop antenna as shown in FIG. 11A. In this embodiment, RF subsystem 103 is electrically connected to one end of ribbon $50^{vii}$ and the other end is grounded. Dipole antenna ribbon $50^{viii}$, FIG. 11B is similar but not grounded on the distal end. An antenna radiator may include a plain weave of Aracon® (metal coated Kevlar®) yarn, nylon, and nonconducting Kevlar® yarn. The warp yarns consist of 35 Aracon® warp ends separated by 7 warp ends of nonconductive Kevlar® and then 35 Aracon® warp ends. The weft consists of a nylon yarn. The width of the antenna radiator is 1 1/16" and was produced in a 20 yard length.

Figure 12:
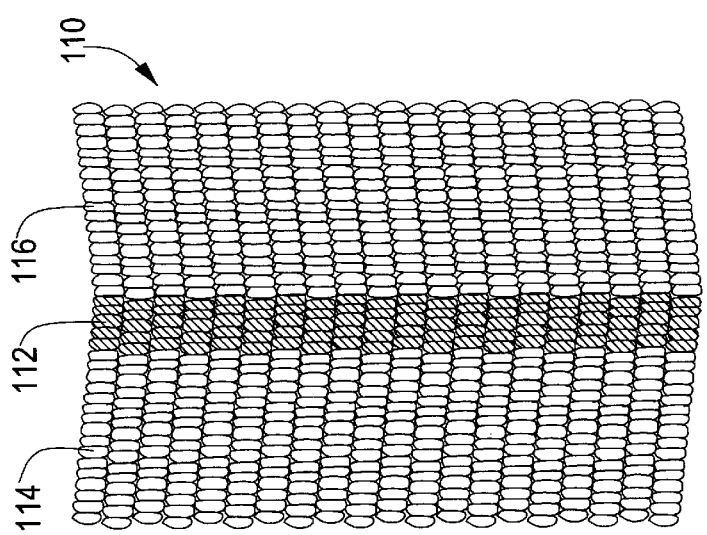
FIG. 12 is a plan view of one embodiment of the power bus version of the subject invention.

Ribbon 110, FIG. 12 forms a DC power bus. Ribbon 110 is narrow woven and includes nylon fibers in the weft direction but conductive metal plated Kevlar® (Aracon®) fibers running in the warp direction. Non-conductive black Kevlar® fibers form insulative strip 112 between the two conductive paths 114 and 116 on either side of insulative strip 112. Ribbon 110, however, may also be used as a loop antenna.

Figure 13:
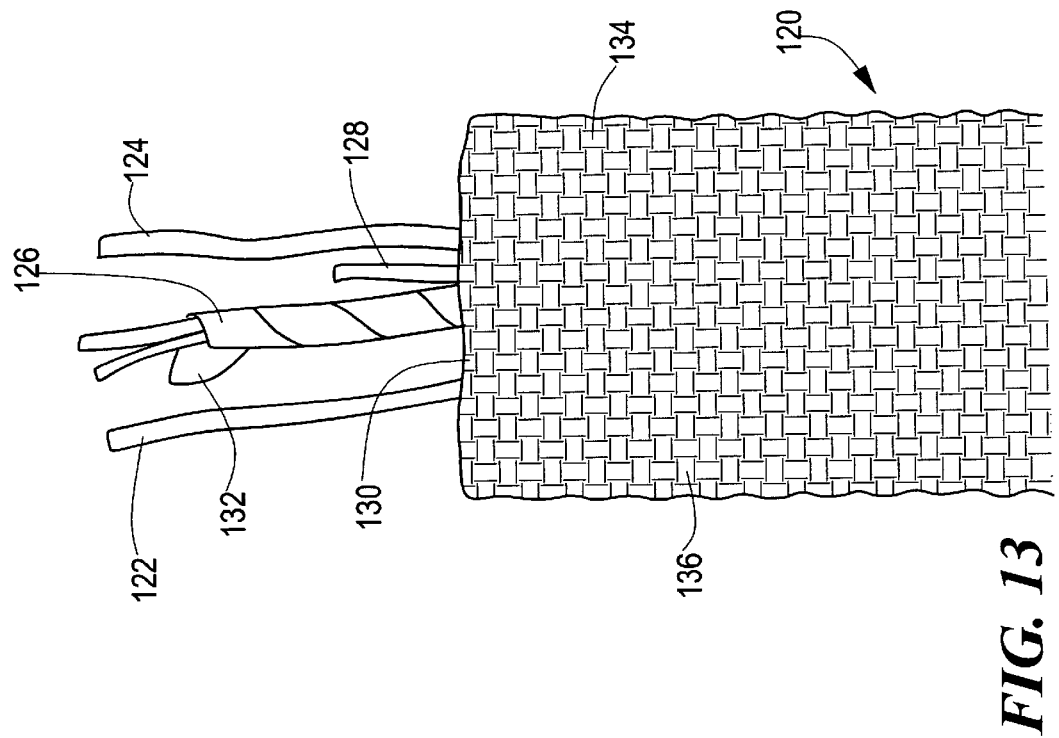
FIG. 13 is a plan view of one embodiment of the subject invention wherein the ribbon forms a universal serial bus.

In FIG. 13, ribbon 120 forms a universal serial bus which comprises a shielded twisted data pair, a drain wire, a power wire, and a ground wire. The ground wire and power wires consist each of a 24 AWG stranded tinned copper wire with insulation. The drain wire is a stranded wire of seven 36 AWG tinned copper wires. The drain wire is woven in the warp position next to the shielded twisted data pair. The data pair consists of two seven stranded 36 AWG tinned copper wires with high density polyethylene insulation. They are twisted with one full twist every 60 mm. Over this pair is served an aluminum metalized polyester shield. The bus is manufactured as a double faced narrow woven with a warp stuffer layer. The wires are in the stuffer warp positions. In the top and bottom faces, seven warp positions are replaced by Bekintex stainless steel fiber to form shielding around the twisted pair. All other warp and weft positions are nylon yarn. The USB ribbon is 1 1/8 inch wide and was produced in a 100 yard length. Transmission element 122 is a 24 AWG wire, transmission element 124 is similar. Transmission element 126 includes two 7×36 AWG tinned copper wires with HDPE insulation twisted with one full twist per 60 mm. Transmission element 128 is a 7×36 AWG tinned copper drain wire. Shielding portion 130 is formed from 12 μm stainless steel fibers running in the warp direction. Shield 132 is an aluminum metalized polyester material. Nylon fibers run in the warp and weft directions in areas 134 and 136.

Figure 14A:
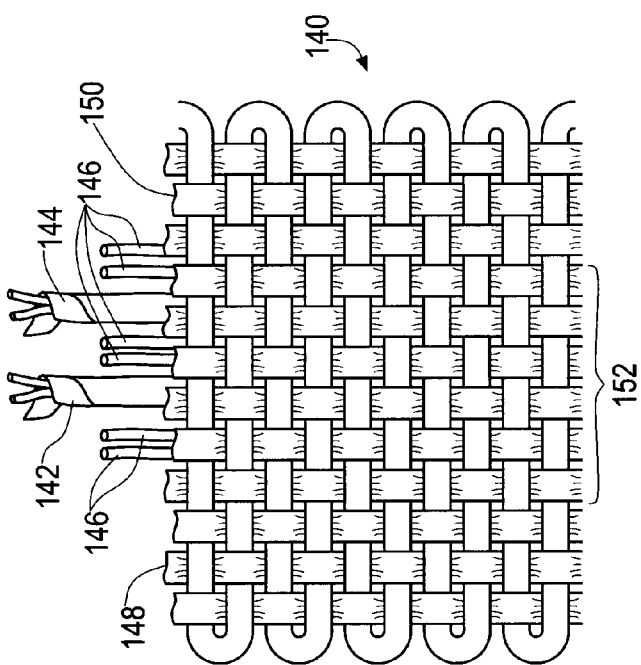
FIGS. 14A and 14B are plan and cross sectional views of one embodiment of the subject invention wherein the ribbon forms a fire wire bus.
Figure 14B:
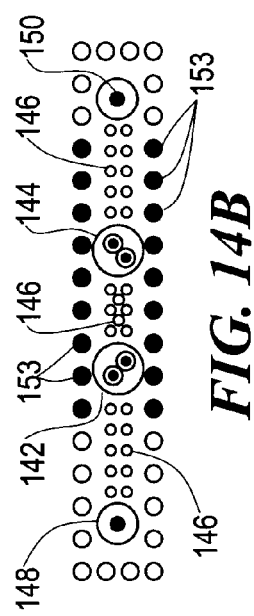

In FIGS. 14A and 14B, ribbon 140 forms a fire wire bus pursuant to the IEEE 1394 standard. Transmission elements 142 and 144 each include two single twisted pairs (28 AWG) with 40 full twists per meter surrounded by metalized polyester tape. Fibers 146 are Aracon® yarns. Transmission element 148 is the power wire (22 AWG tinned copper wire with insulation) and transmission element 150 is the ground wire of a similar construction. Stainless steel yarns 153 and Aracon® yarns 146 in area 152 form the necessary shielding. Ribbon 140 is double faced, narrow woven, and includes stuffer warp yarns.

Figure 15:
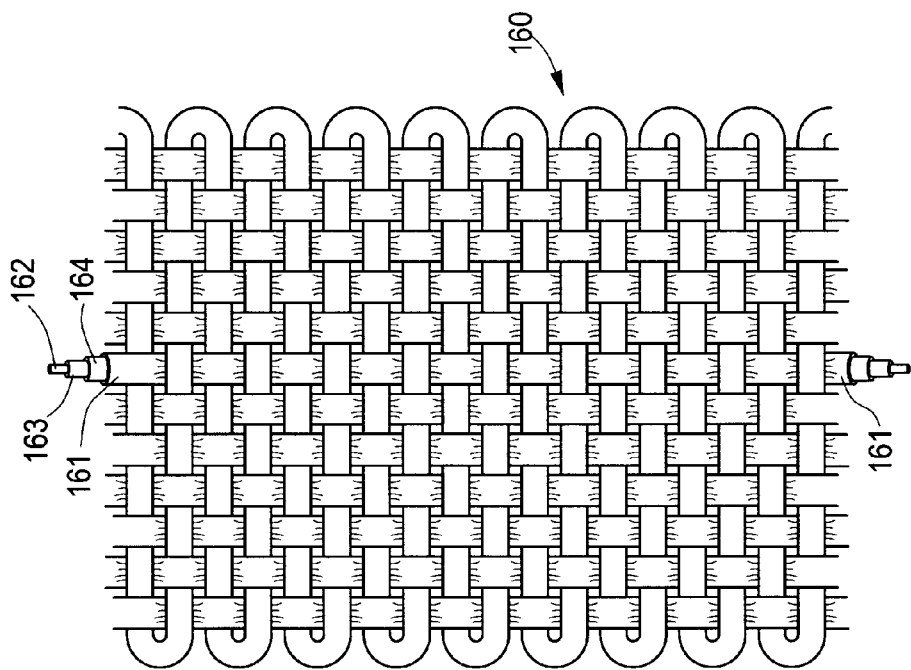
FIG. 15 is a plan view of one embodiment of the subject invention wherein the ribbon forms or includes a coaxial cable.

In FIG. 15, ribbon 160 serves as or includes a coaxial cable 161. Copper wire 162 is metal coated or wrapped in a polymer jacket 163 surrounded with shielding 164. Various transmission elements useful in the subject invention and their properties are shown in Table 1 below:

TABLE 1

Threads/Yarns/Wires

| Material | Trade Name | Manufacturer | Conductivity |
|---|---|---|---|
| Copper Wire | 28 AWG | Belden | 0.0021 ohm/cm |
| Metalized mylar threads (class) | Embroidery Threads | DMC, Sulky, MegaSheen | 9 ohm/cm–140k ohm/cm |
| Silver coated nylon | X-Static | Saquoit Industries | 0.5–13.5 ohm/cm |
| 316 L Stainless steel filment yarn | Bekintex | Bekaert Sprint (France) | 60 ohm/m |
| Carbon Fiber | BADISHE (21/1 Carbon 140 denier) | | 113k ohm/cm |
| Nickel coated carbon fiber | COMPMAT MCG | Composite Materials, L.L.C. | 4.8 ohms/m (6k tow) |
| Copper/Nickel Coated carbon fiber | | Composite Materials, L.L.C. | |
| Nickel/silver/ copper alloy coated Kevlar ® | Aracon ® XN400EF-018 XS200G-060 XS0400E-018 XN0400E-018 | DuPont | 3 ohm/m 2.5 ohm/m 3 ohm/m 2.9 ohm/m |
| Copper or silver coated copper tinsel wire | T3889 T3610 | Montgomery Wire | 0.211 ohm/m (7 strand) 0.050 ohm/m (28 strand) |

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A data or power transmission device comprising:
a plurality of textile fibers;
one or more-shielded data and/or power transmission elements each having a length delimited by two ends integrated with the textile fibers; and
a flat single layer ribbon having a length and two selvage edges parallel to its length and two ends that delimit its length, the ribbon constructed from knitting, weaving or braiding of the textile fibers and the one or more data and/or power transmission elements.

2. The device of claim 1 in which the one or more transmission elements are separated by non-conductive textile fibers and/or non-conductive transmission elements.

3. The device of claim 1 in which the plurality of textile fibers and/or transmission elements are conductive.

4. The device of claim 1 wherein the transmission device is a data bus and there are at least two transmission elements insulated from each other by the fibers.

5. The device of claim 4 in which the data bus is a universal serial bus and includes four transmission elements insulated from each other by the fibers.

6. The device of claim 4 in which the data bus is a fire wire bus and includes either four or six transmission elements insulated from each other by the other fibers.

7. The device of claim 1 in which the transmission elements are selected from the group consisting of solid wire, tinsel wire, conductive fibers, polymeric fibers coated or doped with a conductive material, optical fibers, and combinations of the same.

8. The device of claim 4 in which the data bus is a coaxial cable.

9. The device of claim 1 in which each transmission element is bare, insulated, or shielded, or both insulated and shielded.

10. The device of claim 1 in which the ribbon is knitted and includes wales and courses of overlapping fibers and transmission elements.

11. The device of claim 1 in which the ribbon is woven including weft and warp fibers and the transmission elements replace one or more warp fibers but not the weft fibers.

12. The device in claim 1 in which the ribbon is woven including weft and warp fibers and the transmission elements replace one or more weft fibers but not the warp fibers.

13. The device in claim 1 in which the ribbon is woven including weft and warp fibers and the transmission elements replace one or more warp fibers and one or more weft fibers.

14. The device of claim 1 in which the ribbon is braided including axial fibers and bias fibers and the transmission elements replace one or more axial fibers but not the bias fibers.

15. The device of claim 1 in which the ribbon is braided including bias fibers and the transmission elements replace one or more bias fibers.

16. The device of claim 1 in which the ribbon is braided including axial and bias fibers and the transmission elements replace one or more axial and bias fibers.

17. The device of claim 1 in which the fibers are grouped together in the form of yarns.

18. The device of claim 1 in which the fibers are natural or synthetic fibers.

19. The device of claim 1 in which the ribbon is narrow woven.

20. The device of claim 19 in which the narrow woven ribbon has more than one face.

21. The device of claim 1 in which the ribbon is knitted and includes more than one face.

22. The device of claim 1 in which the ribbon forms an antenna.

23. The device of claim 1 in which the ribbon forms a power bus.

24. A wearable data or power transmission system comprising:
a garment;
a first subsystem;
a second subsystem; and
a knitted, woven, or braided textile ribbon having a length which extends between the first and second subsystems, the ribbon including:
fibers,
selvage edges, and
one or more transmission elements running the length of the ribbon in place of one or more of the fibers, each transmission element connectable on one end to the first subsystem and connectable on the other end to the second subsystem to establish a data or power transmission link between the first and second subsystems,
the first subsystem attached at one location on the garment, the second subsystem attached at a second location, and the ribbon attached to the garment to extend between the first and second subsystems.

25. The system of claim 24 in which the first subsystem and the second subsystem are selected from the group consisting of power sources, electrical devices, electronic systems, electronic devices, optical devices and sensors, and combinations of the same.

26. The system of claim 24 in which the ribbon forms a data bus between the first and second subsystems.

27. The system of claim 24 in which the ribbon forms an antenna.

28. The system of claim 24 in which the ribbon forms a power bus.

29. The system of claim 24 in which the one or more transmission elements are separated by non-conductive fibers.

30. The system of claim 24 in which a plurality of the fibers are conductive.

31. The system of claim 24 wherein the ribbon forms a data bus and there are at least two transmission elements insulated from each other by the fibers.

32. The system of claim 31 in which the data bus is a universal serial bus and includes four transmission elements insulated from each other by the fibers.

33. The system of claim 31 in which the data bus is a fire wire bus.

34. The system of claim 31 in which the data bus is a coaxial cable and includes one transmission element and shielding.

35. The system of claim 24 in which the transmission elements are selected from the group consisting of solid wire, tinsel wire, conductive fibers, polymeric fibers coated or doped with a conductive material, optical fibers, and combinations of the same.

36. The system of claim 24 in which each transmission element is bare, insulated, or shielded, or both insulated and shielded.

37. The system of claim 24 in which the ribbon is knitted and includes wales and courses of overlapping fibers and transmission elements.

38. The system of claim 24 in which the ribbon is woven including weft and warp fibers and the transmission elements replace one or more warp fibers but not the weft fibers.

39. The system of claim 24 in which the ribbon is woven including weft and warp fibers and the transmission elements replace one or more weft fibers but not the warp fibers.

40. The system of claim 24 in which the ribbon is woven including weft and warp fibers and the transmission elements replace one or more weft fibers and one or more warp fibers.

41. The system of claim 24 in which the ribbon is braided including axial fibers and bias fibers and the transmission elements replace one or more axial fibers but not the bias fibers.

42. The system of claim 24 in which the ribbon is braided including bias fibers and the transmission elements replace one or more bias fibers.

43. The system of claim 24 in which the ribbon is braided including bias and axial fibers and the transmission elements replace one or more axial and bias fibers.

44. The system of claim 24 in which the fibers are grouped together in the form of yarns.

45. The system of claim 24 in which the fibers are natural or synthetic fibers.

46. The system of claim 24 in which the ribbon is narrow woven.

47. The system of claim 46 in which the narrow woven ribbon has more than one face.

48. The system of claim 24 in which the ribbon is knitted and includes more than one face.

49. The system of claim 24 in which the ribbon is removably attached to the garment via releasable fasteners so that the ribbon is transferable between garments.

50. A data or power transmission system comprising:
a textile article;
a first subsystem;
a second subsystem; and
a knitted, woven, or braided textile ribbon having a length which extends between the first and second subsystems, the ribbon including:
fibers,
selvage edges, and
one or more transmission elements running the length of the ribbon in place of one or more of the fibers, each transmission element connectable on one end to the first subsystem and connectable on the other end to the second subsystem to establish a data or power transmission link between the first and second subsystems,
the first subsystem attached at one location on the textile article, the second subsystem attached at a second location, and the ribbon attached to the textile article to extend between the first and second subsystems.

51. The system of claim 50 in which the first subsystem and the second subsystem are selected from the group consisting of power sources, electrical devices, electronic systems, electronic devices, optical devices and sensors, and combinations of the same.

52. The system of claim 50 in which the ribbon forms a data bus between the first and second subsystems.

53. The system of claim 50 in which the ribbon forms an antenna.

54. The system of claim 50 in which the ribbon forms a power bus.

55. The system of claim 50 in which the one or more transmission elements are separated by non-conductive fibers.

56. The system of claim 50 in which a plurality of the fibers are conductive.

57. The system of claim 50 wherein the ribbon forms a data bus and there are at least two transmission elements insulated from each other by the fibers.

58. The system of claim 57 in which the data bus is a universal serial bus and includes four transmission elements insulated from each other by the fibers.

59. The system of claim 57 in which the data bus is a fire wire bus.

60. The system of claim 57 in which the data bus is a coaxial cable and includes one transmission element and shielding.

61. The system of claim 50 in which the transmission elements are selected from the group consisting of solid wire, tinsel wire, conductive fibers, polymeric fibers coated or doped with a conductive material, optical fibers, and combinations of the same.

62. The system of claim 50 in which each transmission element is bare, insulated, or shielded, or both insulated and shielded.

63. The system of claim 50 in which the ribbon is knitted and includes wales and courses of overlapping fibers and transmission elements.

64. The system of claim 50 in which the ribbon is woven including weft and warp fibers and the transmission elements replace one or more warp fibers but not the weft fibers.

65. The system in claim 50 in which the ribbon is woven including weft and warp fibers and the transmission elements replace one or more weft fibers but not the warp fibers.

66. The system in claim 50 in which the ribbon is woven including weft and warp fibers and the transmission elements replace one or more weft fibers and one or more warp fibers.

67. system of claim 50 in which the ribbon is braided including axial fibers and bias fibers and the transmission elements replace one or more axial fibers but not the bias fibers.

68. The system of claim 50 in which the ribbon is braided including bias fibers and the transmission elements replace one or more bias fibers.

69. The system of claim 50 in which the ribbon is braided including bias and axial fibers and the transmission elements replace one or more axial and bias fibers.

70. The system of claim 50 in which the fibers are grouped together in the form of yarns.

71. The system of claim 50 in which the fibers are natural or synthetic fibers.

72. The system of claim 50 in which the ribbon is narrow woven.

73. The system of claim 72 in which the narrow woven ribbon has more than one face.

74. The system of claim 50 in which the ribbon is knitted and includes more than one face.

75. The system of claim 50 in which the ribbon is removably attached to the textile article via releasable fasteners so that the ribbon is transferable between textile articles.

76. A method of making a wearable data or power transmission device, the method comprising:

knitting, weaving or braiding a plurality of textile fibers and one or more shielded data and/or power transmission elements into a flat, long and narrow ribbon having two selvage edges; and cutting the flat ribbon into lengths to produce multiple data or power transmission devices.

* * * * *

UNITED STATES PATENT AND TRADEMARK OFFICE
CERTIFICATE OF CORRECTION

PATENT NO. : 6,727,197 B1
DATED : April 27, 2004
INVENTOR(S) : Wilson et al.

It is certified that error appears in the above-identified patent and that said Letters Patent is hereby corrected as shown below:

Title page,
Item [73], Assignee, should be -- Foster-Miller, Inc., Waltham, MA and USA as Represented by the Secretary of the Army, Washington, DC --.

Signed and Sealed this

First Day of November, 2005

JON W. DUDAS
*Director of the United States Patent and Trademark Office*